United States Patent

[11] 3,554,387

[72] Inventors Peter W. Thornhill
    Freeport, Grand Bahama Island,
    Quinton H. Carlton, Leamington Spa,
    England
[21] Appl. No. 746,519
[22] Filed Jul. 22, 1968
[45] Patented Jan. 12, 1971
[73] Assignee Oleo International Holdings Limited
    Leamington Spa, England
[32] Priority Aug. 8, 1967
[33] Great Britain
[31] No. 36376/67

[54] BUFFERS AND DRAW GEAR FOR RAILWAYS, TRAMWAYS AND LIKE VEHICLES
    10 Claims, 5 Drawing Figs.
[52] U.S. Cl. .................................................. 213/223,
    213/43; 267/64
[51] Int. Cl. .................................................. B61g 11/12
[50] Field of Search ........................................ 213/8, 43,
    223; 267/64, 65; 188/96, 88.105

[56] References Cited
    UNITED STATES PATENTS
    3,257,000  6/1966  Cope .............................. 213/43
    3,265,222  8/1966  Goldman ........................ 213/43
    3,400,833  9/1968  Powell ............................ 213/8
    3,411,635  11/1968 Powell ............................ 213/8

Primary Examiner—Drayton E. Hoffman
Attorney—Stevens, Davis, Miller & Mosher

ABSTRACT: A hydraulic buffer or draw gear shock absorber for rail vehicles having means to control flow of liquid from a compression chamber in a cylinder into a reservoir chamber in a hollow plunger which flow control means provide flow restriction of different characteristics during slow inward plunger movement and during rapid inward plunger movement respectively, the said control means comprising a sleeve which, during slow inward plunger movement cooperates with a seat in the cylinder to provide substantially no flow until a predetermined pressure is built up in the compression chamber and during rapid inward plunger movement, moves away from the seat and cooperates with a profiled member to provide increasing flow restriction as the buffer plunger moves inwardly.

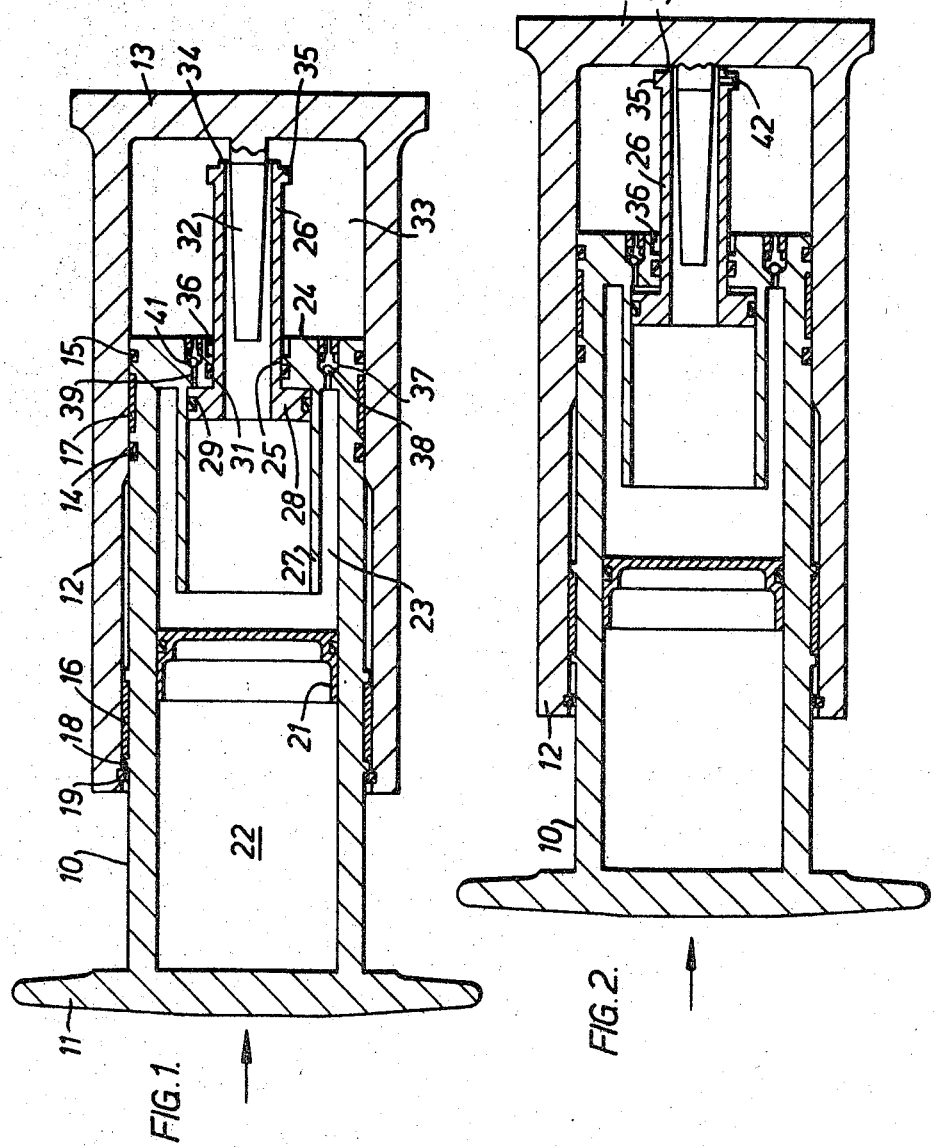

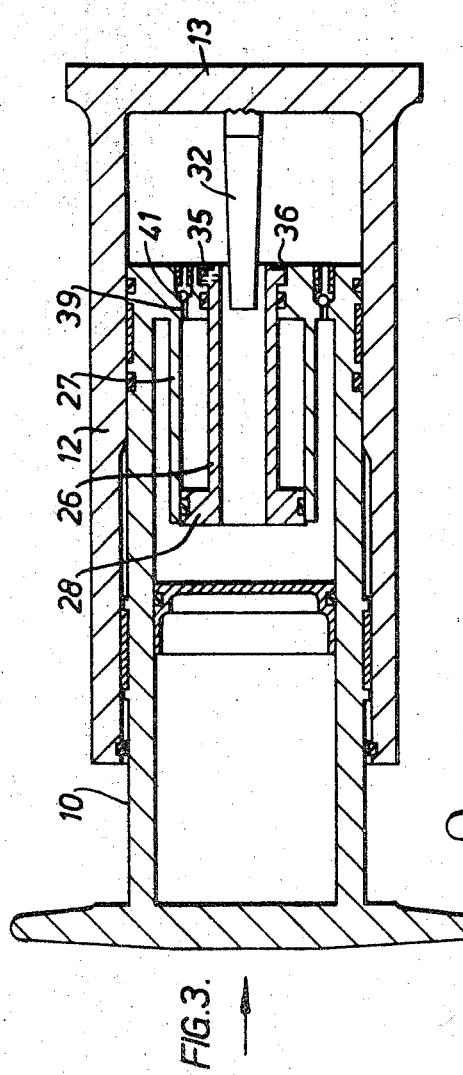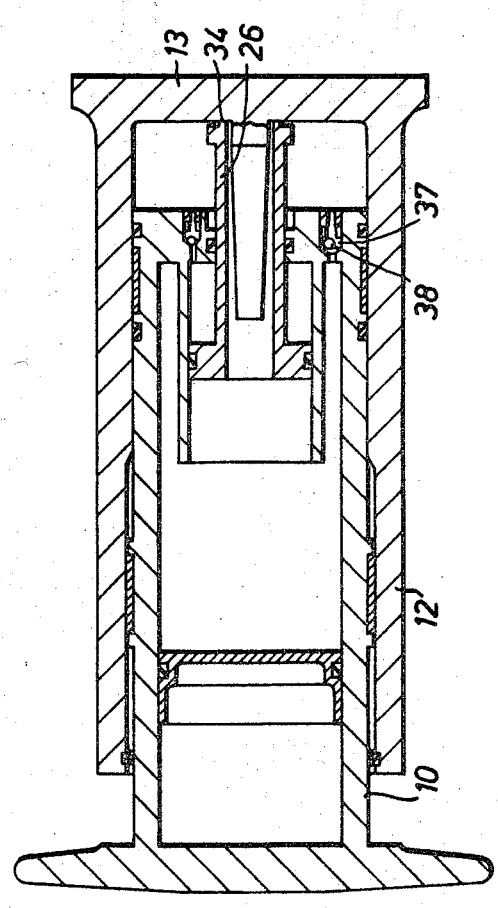
FIG. 3.
FIG. 4.

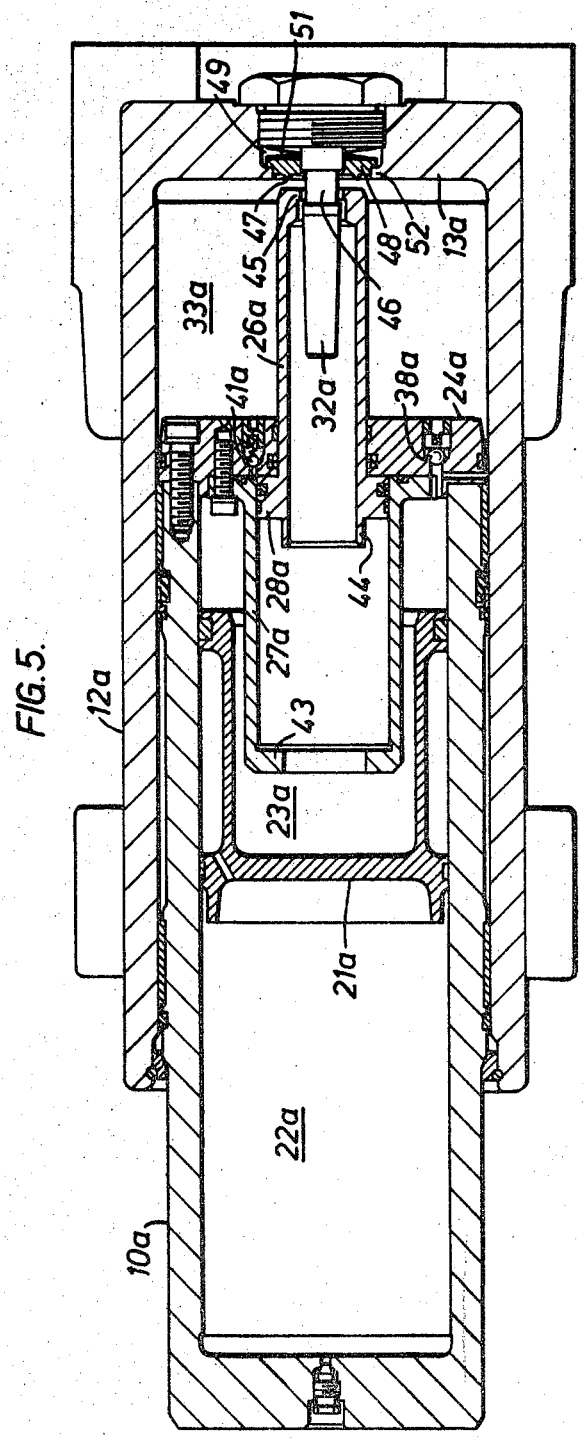

BUFFERS AND DRAW GEAR FOR RAILWAYS, TRAMWAYS AND LIKE VEHICLES

This invention relates to buffers and draw gear shock absorbers for railway, tramway, or like vehicles, the term 'buffer' being used to denote a device which is fixed to the vehicle structure and is independent of the draw gear by means of which the vehicle is coupled to another vehicle, whereas the term 'draw gear shock abosorber' denotes a shock absorber which performs the same function as a buffer but is mounted in the draw gear.

The invention relates to buffers or draw gear shock absorbers of the kind having a cylinder unit and a plunger unit which is forced into the cylinder unit when a load is applied to the buffer, to displace liquid from a compression chamber to a reservoir chamber, resilient means, such as compressed air or other gas, or a mechanical spring, being employed to provide a recoil force opposing the inward movement of the plunger unit.

In the conventional buffer used for example on railway rolling stock (the term buffer being here used as a general term to include draw gear shock absorbers), impact energy is absorbed by displacing oil from one chamber to another through one or more orifices in such a manner that the orifice area through which the oil is displaced is progressively decreased during inward movement of the buffer plunger. In such buffers the resistance to buffer closure provided by the passage of oil through the orifice is a function of closure velocity, the higher the velocity the greater the resistance being to closure and the progressive reduction in orifice area spreads the absorbed energy as evenly as possible throughout the full buffer travel so that the resistance to closure is kept to a minimum.

When the buffer is closed very slowly, the resistance to closure provided by the displacement of oil through the orifice is virtually nil, so that the only resistance to closure is that provided by the recoil spring means.

In order to obtain the best overall performance with this buffer during impacts particularly with lightly loaded vehicles, it is desirable that the recoil spring means should not provide a high resistance as this will be added to the resistance provided by the passage of oil through the orifice and tend to detract from the buffer closure stroke utilized and therefore raise the resistance to closure to a higher level.

During the running of very long trains, braking, change in gradient and locomotive traction effort can all cause tension or compressive forces to be created in the train and although adjacent wagons may move very slowly relative to each other, the number of wagons in a train can result in the relative velocity between the front and rear of the train becoming excessive. In order to retain the movement between adjacent wagons under sufficient control to prevent the relative velocity between the front and rear of the train becoming excessive, it is advantageous that the buffers should provide a comparatively high resistance even when moving very slowly, this resistance should be effective almost from the commencement of closure.

It has already been proposed to provide in a hydraulic buffer of the kind above referred to, means for producing slow closure high resistance characteristics such means comprising a valve referred to as an intensifier valve which however is effective during dynamic impacts and therefore a buffer incorporating an intensifier valve as at present does not meet the above requirements.

It is the object of the present invention to provide a buffer or draw gear shock absorber which provides satisfactory resistance characteristics during both slow and rapid relative movement of the plunger and cylinder units.

According to the present invention, in a hydraulic buffer or draw gear shock absorber for railway, tramway or like vehicles, comprising a cylinder unit, a plunger unit adapted to be forced into the cylinder unit when a load is applied to the said buffer or draw gear shock absorber, a compression chamber and a reservoir chamber, the plunger unit acting to displace liquid from the compression chamber to the reservoir chamber when it is forced into the cylinder unit, resilient means to provide a recoil force opposing inward movement of the plunger, and flow-restricting means to control the flow of liquid from the compression chamber to the reservoir chamber, the flow restricting means comprise a member cooperating with a seat during slow movement of the plunger unit relative to the cylinder unit to close an escape path for liquid from said compression chamber to the reservoir chamber unless the pressure therein exceeds a value determined by loading means acting on the said member, the said member during rapid movement of the plunger unit relative to the cylinder unit being moved out of cooperating relation with said seat and cooperating with a profiled member to provide a resistance to liquid flow from said compression chamber which increases as the plunger moves inwardly of the cylinder unit.

Preferably, the said member comprises a sleeve slidably mounted in the plunger unit so that the bore of said sleeve forms a passage connecting the compression chamber to the reservoir chamber, the seat with which the said sleeve cooperates being formed or provided at one end of the cylinder unit and the profiled member extending from that end of the cylinder into the said sleeve.

The loading means acting on the sleeve may be constituted by the resilient means providing the recoil force on the plunger unit.

The terms 'slow movement' and 'rapid movement' are used to define relative velocities of the plunger and cylinder units which may be respectively above and below any arbitrary value which can be determined by the characteristics of the buffer or shock absorber, 'slow movement,' for example, referring to a velocity up to 1½ feet per second and 'rapid movement' to a velocity exceeding 2 feet per second.

The invention will hereinafter be described with reference to the accompanying drawings, in which:

FIG. 1 is a longitudinal sectional elevation of one form of buffer according to the invention, the buffer being shown in its fully extended condition;

FIG. 2 is a sectional elevation similar to FIG. 1 but showing the buffer at an early stage of its slow compression movement;

FIG. 3 is a sectional elevation similar to FIG. 1 but showing the buffer at an early stage of its rapid compression movement;

FIG. 4 is a sectional elevation similar to FIG. 1 but showing the buffer during its recoil movement; and FIG. 5 is a longitudinal sectional elevation of a draw gear shock absorber showing a modified construction.

It will be understood that the internal construction shown in FIGS. 1 to 4 can be used in a draw gear shock absorber, and the internal construction shown in FIG. 5 can be used in a buffer.

Referring to FIGS. 1 to 4 of the drawings, the buffer comprises a hollow buffer plunger 10 carrying a buffer head 11 (which would be omitted if the device were used as a draw gear shock absorber) at its outer end. The buffer plunger 10 is axially slidable in a buffer cylinder 12 closed at one end by an end wall 13. The buffer plunger 10 carries sealing rings 14, 15 and bearing sleeves 16 and 17 engaging the wall of the cylinder bore, and its outward movement is limited by a shoulder 18 on the plunger engaging a stop ring 19 in the cylinder bore. A floating piston 21, slidable in the hollow plunger 10 divides the interior thereof into an air chamber 22 at the buffer head end and a liquid reservoir chamber 23 at the other end. An end wall 24 of the plunger closing the reservoir chamber 23 has a central aperture 25 in which is slidable a sleeve 26. A tube 27, fixed to the end wall 24 and extending into the reservoir chamber 23, surrounds the aperture 25, the internal diameter of the tube 27 being greater than that of the aperture. The sleeve 26 has at one end a radial external flange 28 which is a sliding fit in the tube 27, sealing rings 29 and 31 carried by the flange 28 and the end wall 24 respectively making fluid-tight engagement with the tube 27 and sleeve 26. A profiled member 32, shown as a straight tapered pin, is fixed to the end wall 13 of the cylinder and extends into the sleeve 26.

The space in the cylinder 12 between the end wall 13 thereof and the end wall 24 of the plunger 10 constitutes a compression chamber 33. The compression chamber 33 and reservoir chamber 23 are filled with liquid which, when the plunger 10 is forced into the cylinder 12, is displaced through the sleeve 26 into the reservoir chamber, compressing the air in the chamber 22 to create a recoil force opposing the inward movement and acting to return the plunger to its outward position when the external force acting on the plunger is removed.

When the buffer is fully extended as shown in FIG. 1, the flange 28 of the sleeve 26 contacts the inner face of the plunger end wall 24, and the opposite end of the sleeve 26 is spaced by a small distance from the cylinder end wall 13. A narrow cylindrical rim 34 is formed on the said opposite end of the sleeve 26, which rim, as will be described hereinafter, cooperates with a seat provided by the inner surface of the end wall 13 of the cylinder under slow inward movement of the plunger.

The sleeve 26 is also provided, at the end carrying the rim 34, with an external radial flange 35, a recess 36 of corresponding radial dimensions being formed in the plunger end wall to receive the flange 35 as shown in FIG. 3.

One or more passages 37 are formed in the plunger end wall 24 to connect the reservoir chamber 23 with the compression chamber 33, nonreturn valves 38 in the passages 37 preventing flow of liquid from the compression chamber into the reservoir chamber.

A further passage 39 in the plunger end wall connects the compression chamber 33 to the annular space between the sleeve 26 and the tube 27, a nonreturn valve 41 in this passage preventing flow of liquid from the compression chamber 33 into the said annular space.

The action of the buffer during slow relative movement of the plunger 10 and cylinder 12, such as is produced during the running of a train by braking or changes in gradient or locomotive traction effort, is as follows. The initial relative movement causes liquid to flow from the compression chamber 33 into the reservoir chamber 23 until the rim 34 on the sleeve 26 contacts its seat on the cylinder end wall 13 tending to close off the communication between the two chambers. The plunger continues to move inwardly so that, as soon as the rim 34 contacts its seat, the flange 28 is forced away from the plunger end wall 24 and vacuum is created in the sealed annular space between the sleeve 26 and the tube 27, which provides an effective thrust on the sleeve 26 sufficient to hold it seated on the end wall of the cylinder and prevent further transfer of liquid until the pressure built up in the compression chamber 33, acting on the effective area of the sleeve end outside the rim 34, is sufficient to overcome the resultant thrust on the sleeve 26 due to the pressure in the reservoir chamber 23, produced by the air pressure acting through the floating piston 21 on the liquid in said chamber 23, acting on the area of the flange 28 and the vacuum on the other side of said flange. The sleeve 26 then lifts slightly clear of the cylinder end wall to allow slow flow of liquid into the reservoir chamber. This position is shown in FIG. 2.

The action of the buffer during rapid relative movement of the plunger 10 and cylinder 12 is different. Under these conditions, the restriction to flow of liquid between the larger end of the pin 32 and the sleeve 26 is too great to allow liquid to be transferred at a sufficient rate to the reservoir chamber 23, and the pressure in the compression chamber 33 forces the sleeve towards the position shown in FIG. 3, bringing the end of the sleeve 26 having the rim 34 thereon opposite to the smaller end of the pin 32. so that an initially lower degree of flow restriction is provided but, as relative inward movement of the plunger continues, a progressively increasing flow restriction is created, and the buffer presents shock absorbing characteristics, more closely resembling those of a conventional hydraulic buffer.

The flange 35 provides a stop to limit movement of the sleeve 26 into the plunger 10, the said flange entering the recess 36 in the plunger end as the sleeve approaches its limiting position, so that liquid trapped in the recess cushions its final movement.

When the inward stroke of the plunger 10 is terminated, and the said plunger commences to move outwardly, the resulting fall in pressure in the compression chamber 33 causes the rim 34 in the sleeve to seat on the cylinder end wall as shown in FIG. 4, preventing return flow of liquid to the compression chamber 33. The return flow therefore takes place through the passage or passages 37 and the nonreturn valves 38 therein.

Although, as described above, the annular space between the sleeve 26 and the tube 27 is sealed, continuous working of the buffer, and possible wear of the sealing rings 29 and 31, may result in small quantities of oil entering the said annular space. If such leakage occurred, the initial position of the sleeve 26 relative to the plunger 10 would gradually change, the sleeve moving into the plunger, which would disturb the action of the buffer. The passage 39 and nonreturn valve 41 allow any such liquid to escape from the annular space during recoil of the buffer, when the pressure in the compression chamber 33 is less than that in the reservoir chamber 23.

It may be found desirable, in some circumstances to provide a small leak passage for the flow of liquid from the compression chamber 33 to the reservoir chamber 23 during slow inward movement of the plunger 10, so that the rim 34 on the sleeve 26 can remain in contact with its seat. Such a leak passage may be provided by a radial hole 42 of small diameter in the sleeve 26, or by a notch cut in the rim 34.

In the modified arrangement shown in FIG. 5 of the drawings, parts corresponding to those included in the arrangement of FIGS. 1 to 4 are indicated by the same reference numerals with the addition of the letter $a$. The plunger 10$a$ is slidable in the cylinder 12$a$ as already described, no buffer head being provided on the plunger 10$a$ because the device is intended to be incorporated in draw gear. A floating piston 21$a$ divides the interior of the plunger 10$a$ into an air space 22$a$ and a liquid reservoir chamber 23$a$ and a compression chamber 33$a$ is formed between an end wall 24$a$ on the plunger and an end wall 13$a$ closing the cylinder 12$a$.

A sleeve 26$a$ slidable in an opening 25$a$ in the plunger end wall 24$a$ has a flange 28$a$ slidable in a tube 27$a$ extending from the plunger end wall 24$a$ into the reservoir chamber 23$a$, and the sleeve 26$a$ cooperates with a seat on the cylinder end wall 13$a$ and with a tapered metering pin 32$a$ in substantially the manner described with reference to FIGS. 1 to 4. Nonreturn valves 38$a$ and 41$a$, corresponding to the nonreturn valves 38 and 41, and mounted in similar passages, are also provided.

In this arrangement, the movement of the sleeve 26$a$ into the reservoir chamber 23$a$ due to initial rapid relative movement of the plunger 10$a$ and cylinder 12$a$ is limited by an internal flange 43 on the end of the tube 27$a$ remote from the plunger end wall 24$a$, against which the flange 28$a$ on the sleeve 26$a$ abuts at the end of such inward movement. To cushion the last part of such movement, the sleeve 26$a$ is provided with a tubular extension 44 beyond the flange 28$a$ which enters with a very small clearance into the opening surrounded by the flange 43 and traps liquid which is expelled through the said small clearance, providing a dashpot effect.

The sleeve 26$a$, at its end remote from the flange 28$a$, is reduced in diameter internally at 45 to provide an orifice cooperating with the metering pin 32$a$ during rapid inward relative movement of the plunger and cylinder. To provide a sufficient orifice area for the flow of liquid during initial slow inward movement, the metering pin is provided with a reduced neck 46 adjacent its end which is fixed in the cylinder end wall 13$a$. The end surface of the sleeve 26$a$ adjacent the cylinder end wall 13$a$ is flat and cooperates with a cylindrical rim 47 on a disc 48 mounted in a recess 49 in the end wall 13$a$, the disc 48 being urged towards the interior of the cylinder by resilient means comprising a stack of spring washers 51 and being normally held by the said resilient means against a shoulder 52 in the recess. It has been found that, at the changeover point between inward and outward movement of the plunger 10a relative to the cylinder 12a, after a rapid inward movement, when the pressure in the compression chamber 33a drops below that in the reservoir chamber, the sleeve 26a moves very rapidly towards its normal position, and strikes the seat on the cylinder end wall with a considerable impact force. The resilient loading of the seat cushions this impact. A slow leakage path for liquid from the compression chamber to the reservoir chamber when the sleeve 26a is in engagement with the seat rim 47 may be provided as described with reference to FIGS. 1 to 4.

The operation of this arrangement is the same as the operation of the arrangement described with reference to FIGS. 1 to 4.

In hydraulic buffers incorporating steel or rubber springs to provide the recoil force instead of compressed air, the said springs may be used in the same manner as the compressed air is used in the embodiments described herein. Alternatively, separate spring means of the steel or rubber type may be arranged to act directly on the sleeve to oppose its movement inwardly of the plunger.

The full effective area of the end of the sleeve exposed in the compression chamber, and the effective area of the said sleeve exposed in the compression chamber after the said end of the sleeve has contacted its seat on the cylinder end wall, as well as the magnitude of the force acting on the sleeve to oppose its movement inwardly of the plunger, can all be varied in order to control the pressure in the compression chamber required to force the sleeve into the plunger before and after it has made contact with its seat.

We claim:

1. A hydraulic buffer or draw gear shock absorber for railway, tramway or the like vehicles comprising a cylinder unit, a plunger unit adapted to be forced into said cylinder unit when a load is applied to said buffer or draw gear shock absorber, a compression chamber and a reservoir chamber; said plunger unit acting to displace liquid from said compression chamber to said reservoir chamber when said plunger unit is forced into said cylinder unit; resilient means to provide a recoil force opposing inward movement of said plunger, and flow restricting means to control the flow of liquid from said compression chamber to said reservoir chamber; said flow-restricting means comprising a member cooperating with a seat during slow movement of said plunger unit relative to said cylinder unit to close an escape path for liquid from said compression chamber to said reservoir chamber unless the pressure therein exceeds a value determined by loading means acting on said member; said member comprising a sleeve slidably mounted in said plunger unit so that the bore of said sleeve forms a passage connecting said compression chamber to said reservoir chamber, the seat with which said sleeve cooperates being formed or provided at one end of said cylinder unit and further comprising a profiled member extending from that end of said cylinder into said sleeve; said member during rapid movement of said plunger unit relative to said cylinder unit being moved out of cooperating relation with said seat and cooperating with said profiled member to provide a resistance to liquid flow from said compression chamber which increases as said plunger moves inwardly of said cylinder unit.

2. A hydraulic buffer or draw gear shock absorber according to claim 1, wherein the loading means acting on the sleeve are constituted by the resilient means providing the recoil force on the plunger unit.

3. A hydraulic buffer or draw gear shock absorber according to claim 2, wherein the reservoir chamber is formed in the plunger unit, the resilient means providing the recoil force acting through a movable wall on liquid in said reservoir chamber to displace said liquid into the compression chamber when a compressive force acting on the buffer or draw gear shock absorber is relieved.

4. A hydraulic buffer or draw gear shock absorber according to claim 3, wherein the sleeve is slidable in an opening in the inner end wall of the plunger unit and has a flange at its end which extends into the reservoir chamber which flange is a sliding fit in a tube extending from the said inner end wall of the plunger unit into the reservoir chamber so that an annular space is provided between said tube and the sleeve when the latter is displaced inwardly of said reservoir chamber, the said annular space being sealed against the entry of air or liquid.

5. A hydraulic buffer or draw gear shock absorber according to claim 4, wherein a nonreturn valve is provided to allow escape of liquid from said annular space.

6. A hydraulic buffer or draw gear shock absorber according to claim 5, wherein cushioning means are provided to cushion the final portion of the movement of the sleeve into the reservoir chamber.

7. A hydraulic buffer or draw gear shock absorber according to claim 6, wherein the cushioning is provided by trapping liquid between opposed annular surfaces on the sleeve and tube.

8. A hydraulic buffer or draw gear shock absorber according to claim 1, wherein the seat for the sleeve is supported by resilient means.

9. A hydraulic buffer or draw gear shock absorber according to claim 1, wherein at least one nonreturn valve is provided for the return of liquid from the reservoir chamber to the compression chamber.

10. A hydraulic buffer or draw gear shock absorber according to claim 1, wherein the profiled member in formed with a reduced neck adjacent its larger end, the sleeve having a portion of reduced internal diameter which surrounds said neck when the buffer or shock absorber is fully extended.